United States Patent
Lindgren

(10) Patent No.: US 7,069,976 B2
(45) Date of Patent: Jul. 4, 2006

(54) METHOD AND ARRANGEMENT FOR CONTROLLING THE TEMPERATURE OF THE OUTSTREAM FLOW FROM A HEAT EXCHANGER AND MEASURING PRODUCED HEAT

(76) Inventor: Matts Lindgren, Södra Saltsjönäsvägen 31, SE-421 66, Västra Frölunda (SE)

( * ) Notice: Subject to any disclaimer, the term of this patent is extended or adjusted under 35 U.S.C. 154(b) by 0 days.

(21) Appl. No.: 10/698,386

(22) Filed: Nov. 3, 2003

(65) Prior Publication Data
US 2004/0153280 A1 Aug. 5, 2004

Related U.S. Application Data

(63) Continuation of application No. PCT/SE01/00952, filed on May 3, 2001.

(51) Int. Cl.
*F24D 19/10* (2006.01)
(52) U.S. Cl. ............ 165/11.1; 165/299; 165/300; 165/295; 165/388; 165/292; 165/293; 165/236; 374/42; 374/41; 374/40; 374/39; 236/78 B; 236/78 D
(58) Field of Classification Search ............ 165/11.1, 165/299, 300, 279, 292, 293, 295, 288, 236, 165/291; 374/40, 41, 39; 236/78 B, 78 D
See application file for complete search history.

(56) References Cited

U.S. PATENT DOCUMENTS

| | | | | |
|---|---|---|---|---|
| 3,820,590 A | * | 6/1974 | Littman et al. | 165/292 |
| 4,050,506 A | * | 9/1977 | Small | 165/299 |
| 4,157,034 A | * | 6/1979 | Buchele | 374/41 |
| 4,244,216 A | * | 1/1981 | Dukelow | 374/39 |
| 4,509,679 A | * | 4/1985 | Longini | 236/94 |
| 4,574,870 A | | 3/1986 | Weitman | |
| 4,702,306 A | * | 10/1987 | Herzog | 165/279 |
| 5,026,171 A | * | 6/1991 | Feller | 374/41 |

(Continued)

FOREIGN PATENT DOCUMENTS

DE    35 21 188 A1    12/1986

(Continued)

OTHER PUBLICATIONS

A. Trüschel, *Hydronic Heating Systems*- The Effect of Design on System Sensitivity, Dept. of Building Service Engineering, Chalmers University of Technology, Göteborg, Sweden 2002.

*Primary Examiner*—John K. Ford
(74) *Attorney, Agent, or Firm*—Young & Thompson

(57) ABSTRACT

Process and device for controlling the temperature of an outbound secondary flow in a secondary circuit from a heat exchanger by a primary flow in a primary circuit, via a member that regulates the primary flow, influenced by a control unit. The enthalpy difference between inbound and outbound primary flow to and from the heat exchanger and the secondary flow are determined. The flow in the primary circuit is determined, and the parameters are supplied to the control unit for controlling the member, whereby the primary flow is controlled in dependence of the secondary flow, so that power supplied to the heat exchanger substantially equals the sum of the power needed to raise the temperature of the secondary flow from the initial temperature to the desired outbound temperature; the assumed power requirement for compensating for energy stored in the heat exchanger; and the assumed leak power from the heat exchanger.

16 Claims, 8 Drawing Sheets

U.S. PATENT DOCUMENTS

| | | | |
|---|---|---|---|
| 5,197,537 A * | 3/1993 | Chigira et al. | 165/291 |
| 5,324,111 A * | 6/1994 | Hasegawa | 374/40 |
| 5,363,905 A | 11/1994 | Rhiel et al. | |
| 5,904,292 A | 5/1999 | McIntosh | |
| 6,796,375 B1 * | 9/2004 | Williges | 165/297 |

FOREIGN PATENT DOCUMENTS

| | | |
|---|---|---|
| SE | 8204948 A | 3/1984 |
| WO | 82/01063 | 4/1982 |
| WO | 99/54665 | 10/1999 |

* cited by examiner

METHOD AND ARRANGEMENT FOR CONTROLLING THE TEMPERATURE OF THE OUTSTREAM FLOW FROM A HEAT EXCHANGER AND MEASURING PRODUCED HEAT

This application is a continuation of PCT/SE01/00952 filed May 3, 2001.

The present invention relates to a method and a device for controlling the temperature of at least one outbound secondary flow in a secondary circuit from a heat exchanger through a primary flow in a primary circuit, via a control member which can be affected by a control unit, which member regulates the primary flow. The invention also relates to a method for measuring yielded power and heat quantity.

BACKGROUND OF THE INVENTION AND THE PROBLEM

During delivery of hot tap water in district heating station, a primary flow of centrally heated water, which is conducted into a heat exchanger, where a secondary flow of hot tap water is heated to a constant consuming temperature in the heat exchanger. Control of the constant consuming temperature on the secondary side have been obtained in the district heating station, either through automatic mechanical, or through electronic control devices, which control the temperature on the basis of correction of the difference between desired and actual outbound temperature on the secondary side through feedback temperature measurement from the secondary side. Whenever electronic control devices are used, PI or PID regulators are commonly used, which control the flow on the primary side by, depending on the present outbound temperature on the secondary side, closing or opening a valve on the primary side. Thus, the heating effect on the primary side is regulated, so that the desired outbound temperature on the hot tap water is obtained.

Both the mechanical and the electronic systems exhibit drawbacks, since the control is not as fast as would be desired, whereby there may be a delay before the correct outbound temperature is reached on the secondary side. This entails a lag before the correct temperature is obtained at the tap location of the secondary circuit, and, in the worst case, a risk of scalding.

Another drawback is that an oscillation in the control easily arises, since it is, in practise, impossibly to optimise the regulating equipment with respect to all occurring operating conditions. The conducting temperature and difference pressure of the district heating system, i.e., the primary side, varies during the year and along the path of the district heating line.

The pressure fluctuations in the district heating system are partly dependent on the present distance from the heat source, partly on the relative position of the district-heating central in the system. The statically programmed characteristics of the regulators cannot be optimised with respect to all occurring operation scenarios, which entails, among other things, oscillations of the outbound temperature during certain operating conditions. The temperature oscillations entail e.g. the following potential drawbacks.

Poor comfort at tap locations with a small smoothening effect from the line system, which I particularly noticeable in single household residential property.

Increased calcification of heat exchangers when temperatures above 60° C. are reached. Increased wear of regulating members.

Impaired cooling of the district heating system, which may entail large production costs.

A system is previously known from U.S. Pat. No. 5,363,905, where a feedback temperature from the secondary side is used to affect the regulatory valve on the primary side. This type of solution corrects different pressures on the primary side, but it does not provide the desired rapid correction of the temperature during fluctuations in the flow of hot tap water on the secondary side. In this case, measuring of the pressure drop over a constriction in the primary circuit is used, as well as pressure measurement on the primary side, but also measurement of the temperature before and after the heat exchanger on the primary side. This system becomes relatively expensive, since two pressure gauges are needed on the primary side, and can not readily provide rapid regulation of the temperature on the secondary side upon sudden changes of the tap flow on the secondary side. The regulatory measures will not come into action until the temperature actually drops on the secondary side, and the typical oscillations of the hot tap water temperature are obtained.

EP 0,526,884 discloses a regulatory technique from thermo printers, in which the write head is controlled to a constant temperature, primarily by regulating the electric energy delivered to the print head, and secondarily by an adjustably compensating coolant flow. The temperature of the thermal head is measured by a first temperature sensor, and the temperature of the removed coolant fluid is measured by a second temperature sensor. The system calculates the removed heating capacity in the coolant flow by measuring and regulating the coolant flow, and measures the temperature of the inbound, as well as the outbound (heated), coolant flow.

Through WO 96/17210, a control system for a district heating plant is previously known, in which is comprised temperature measurements, and measurement of the flow on the primary side, with the purpose to provide the desired control, and to calculate the consumed power to be billed to the customer. Also in this case, flow measurement was not used on the secondary side, meaning that the system likely is subjected to oscillations in the temperature of the outbound water on the secondary side.

DE U 1 296,17,756 discloses a system, in which a shunting control is carried out on the primary side, with a feedback, on the primary side, of outbound flow from the heat exchanger, back to the inbound flow of the heat exchanger. Here, the assumption is made that, if the temperature of the outbound flow on the primary side from the heat exchanger is kept constant, a constant temperature of the hot tap water on the secondary side will be obtained. This assumption unconditionally entails that oscillations of the temperature on the secondary side are obtained, since the surfaces of the heat exchanger first must be cooled by the hot tap water. Further, the system does not respond rapidly to abrupt increases in the flow of hot tap water, since the regulation is not effected until the temperature on the primary side has dropped.

The prior art has not recognised the need to take rapid action when the heat consumption on the secondary side abruptly changes, i.e., when the flow is altered incrementally. This means that the control systems often end up in oscillating conditions, as far as the temperature on the secondary side is concerned. In spite of the multitude of separate solutions to the partial problems, no system has exhibited characteristics, simultaneously allowing a stabile function regardless to the location in the district heating system. Most systems in which the temperature is to be carefully controlled on the secondary side have comprised regulatory loops with feedback information concerning the current temperature value, whereby countermeasures are taken against the deviation of the measured value of the outbound temperature from the set point value of the same. Thus, this system is based on action in dependence on the error in the resulting outbound temperature. Such a system must wait until an error can be detected before countermeasures can be taken, which entails a delay of the time point when the actual desired heat consumption is altered.

THE PURPOSE OF THE INVENTION

The purpose of the invention is to obtain a rapid and stable controlling equipment in heat exchanging systems, where large variations may occur on the primary side as far as inbound temperatures and differential pressure are concerned, where an improved consistency of the hot tap water temperature on the consumer side is achieved without the necessity for feedback of the actual temperature value from the secondary side, for actually keeping the temperature constant.

These tasks have been solved through the characteristics indicated in the accompanying claims.

Through the invention, the risk for oscillations in the temperature is eliminated on the secondary side, which in a district heating plant corresponds to a hot tap water circuit. Often, a district heating plant also has heat exchange circuits for radiator and ventilation systems, for which the invention is well adapted. For this type of systems, the dynamics of load changes are often slower.

The invention provides improved load adaptability, independent of consumer size. Also, the risk for calcification in heat exchangers is reduced significantly, since faster control systems with higher precision can counter temperature peaks above 60° C.

Consistency of the hot tap water temperature on the consumer side is based upon determination of the needed heating power needed to increase (alternatively, in a cooling application, to reduce) the temperature of the secondary flow to a set point value. The invention is not based upon a dynamic correction of the error between the desired and the actual temperature of the outbound secondary medium, which entails that the control may be executed without feedback of the actual temperature value from the secondary side.

In most district heating systems, the invention also entails that the control system may be installed without adjustment of regulatory parameters, which strongly reduces the time required for installation and service/fine tuning.

In a further embodiment, the procedure and the device are suitable also to be able to deal with changes on the secondary side, concerning temperature fluctuations of the inbound water to be heated in the heat exchanger. This embodiment is applied when the temperature of the inbound cold water fluctuates. (In the normal case, the water is assumed to have a largely constant temperature.) Through this embodiment, the same system may be applied in a greater geographical region, and for another region corrections, mainly for possible temperature fluctuations of the inbound fresh water, may take place through simple modifications.

The invention may also be utilised for measuring transmitted power and heat quantity, e.g. for billing purposes or follow-up of energy expenditure, and it is also applicable in cooling applications, whereby only the direction of the heat transport is changed.

DESCRIPTION OF THE DRAWINGS

Below, the invention will be further described, in the form of a number of embodiments, with reference to the accompanying drawings.

FIG. 1 b–d, shows examples of variations of embodiments of the system of FIG. 1.

DESCRIPTION OF EMBODIMENTS

Figure 1A:
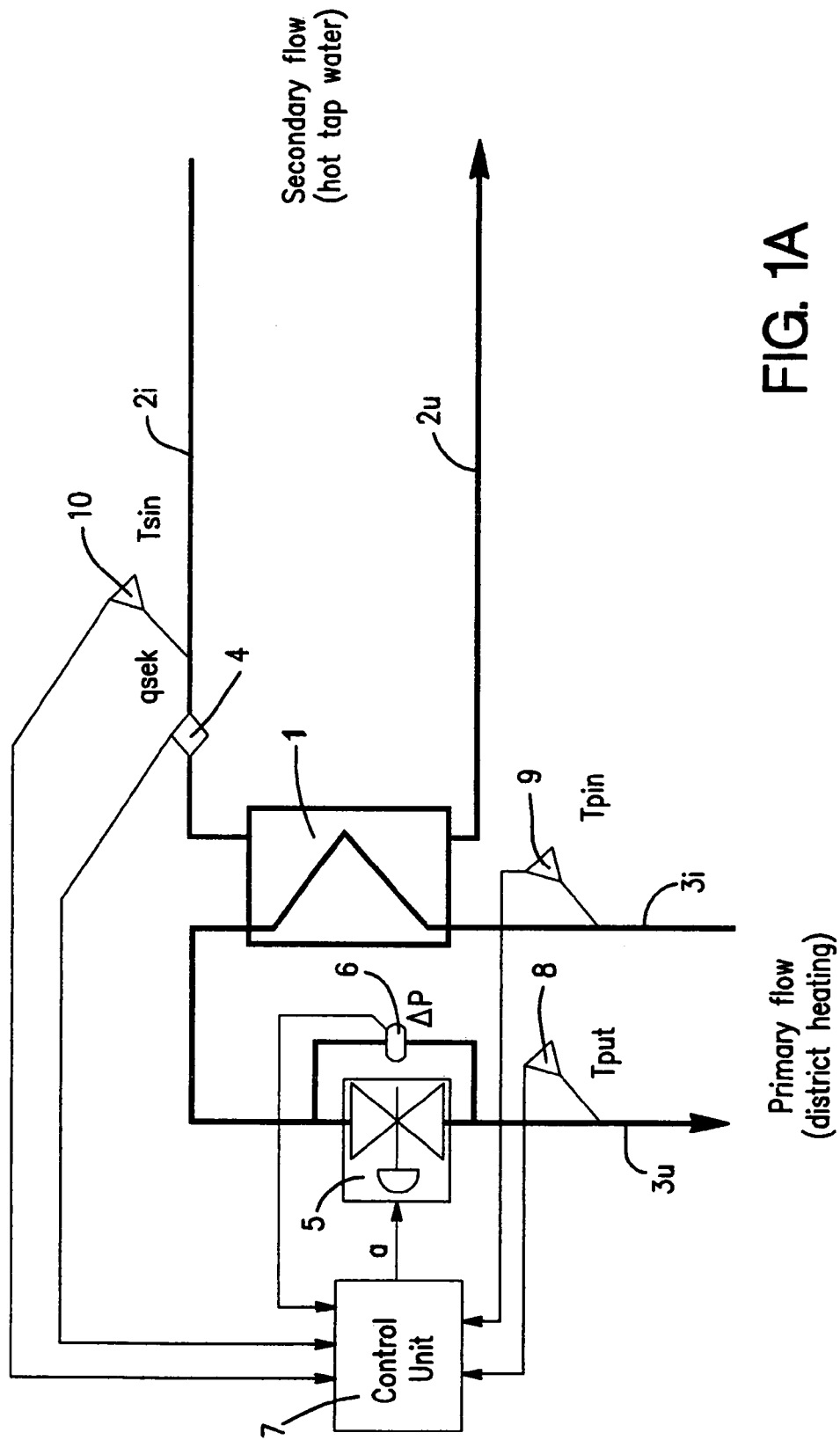
FIG. 1 a, schematically shows a connection diagram of the system of the invention.
Figure 1B:
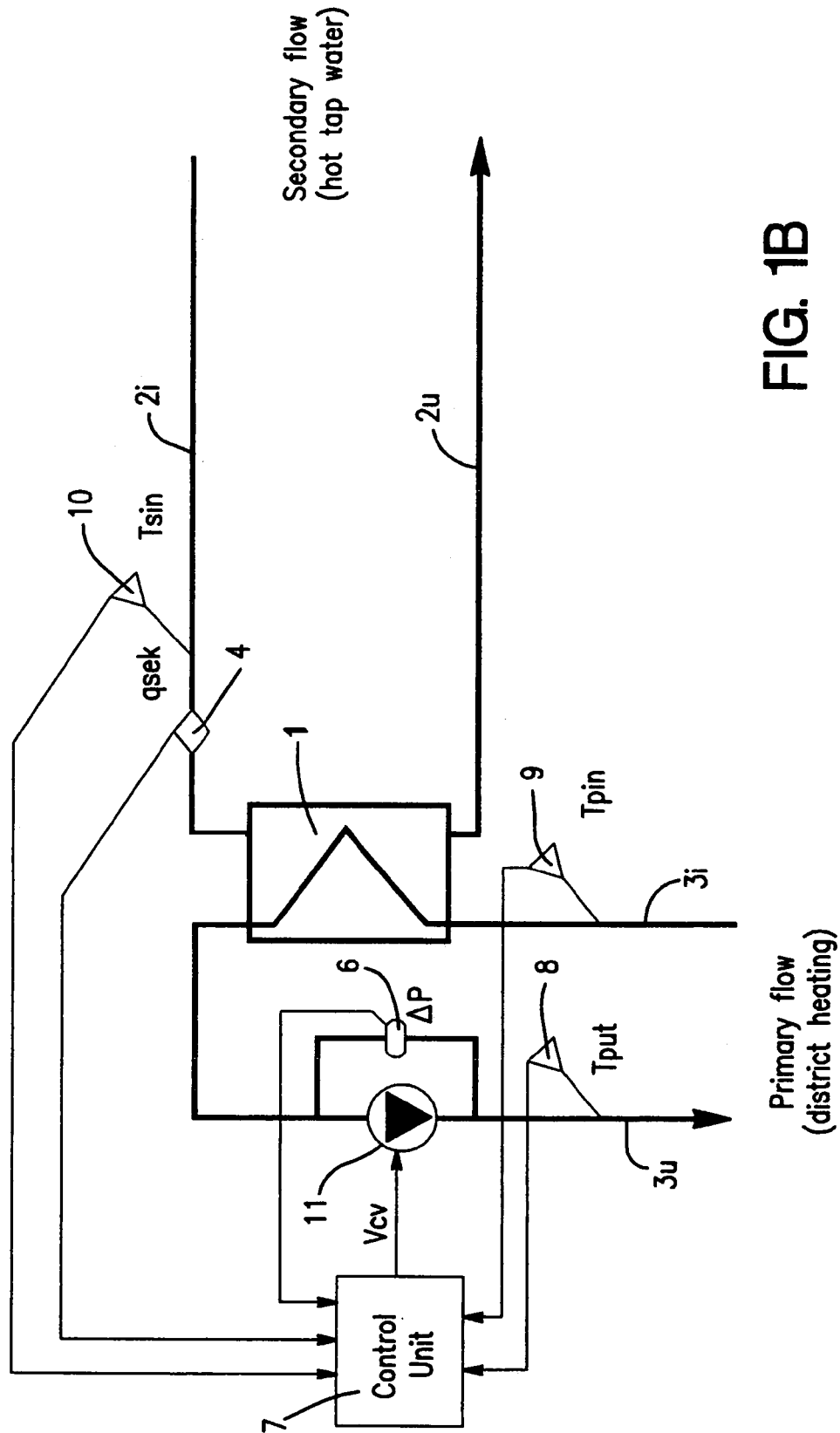

FIG. 1 a shows an implementation of the invention in a district heating station of a consumer. The station comprises a heat exchanger 1, comprising a primary circuit 3, and a secondary circuit 2. The inbound primary flow 3i to the primary circuit 3 is constituted by hot water from the central heating system, while the outbound primary flow 3u is constituted by recycled water. The secondary flow 2i of the secondary circuit 2 is constituted by incoming fresh water, heated in the heat exchanger 1, while the tapped secondary flow 2i is constituted by heated hot tap water, conducted to the taps of the end consumer or the customer. When the temperature of the inbound secondary flow 2i can not be assumed to be otherwise known (for instance, through being constant and known beforehand), a temperature gauge is arranged in the inbound flow 2i (shown with dashed lines in the figures).

A flow meter 4 is arranged in the secondary circuit 2i–2u, preferably on the opening side, and the signals of which the flow meter is directed towards a control unit 7. On the primary side, a first temperature gauge 8 is arranged at the inbound flow 3i, and a second temperature gauge 9 is arranged at the return flow 3u. The output signals from these gauges are transmitted to the control unit 7.

For the control of the flow 3 through the primary side, a control valve 5 is arranged in the primary circuit, preferably on the return flow 3u, which gives lower temperature and cavitation loads on the valve. The degree of opening, a, of the valve is regulated by a control member 25, which in turn receives control signals from the control unit 7.

In the shown embodiment, a pressure difference gauge 6 is used for determination of the flow through the primary circuit 3i–3u, which gauge is connected between the inlet and outlet of the control valve 5.

In FIG. 1 b, an embodiment similar to the one shown in FIG. 1 a is shown, but here the control member acting on the primary circuit is constituted by a pump 11, with a predetermined relation between the flow 3 through the same as a function of the rotation speed, and the difference pressure across the pump. The difference pressure ΔP across the pump is measured by a pressure difference gauge 6. The control unit 7 controls the rotation speed of the pump to the desired primary flow 3.

Figure 1C:
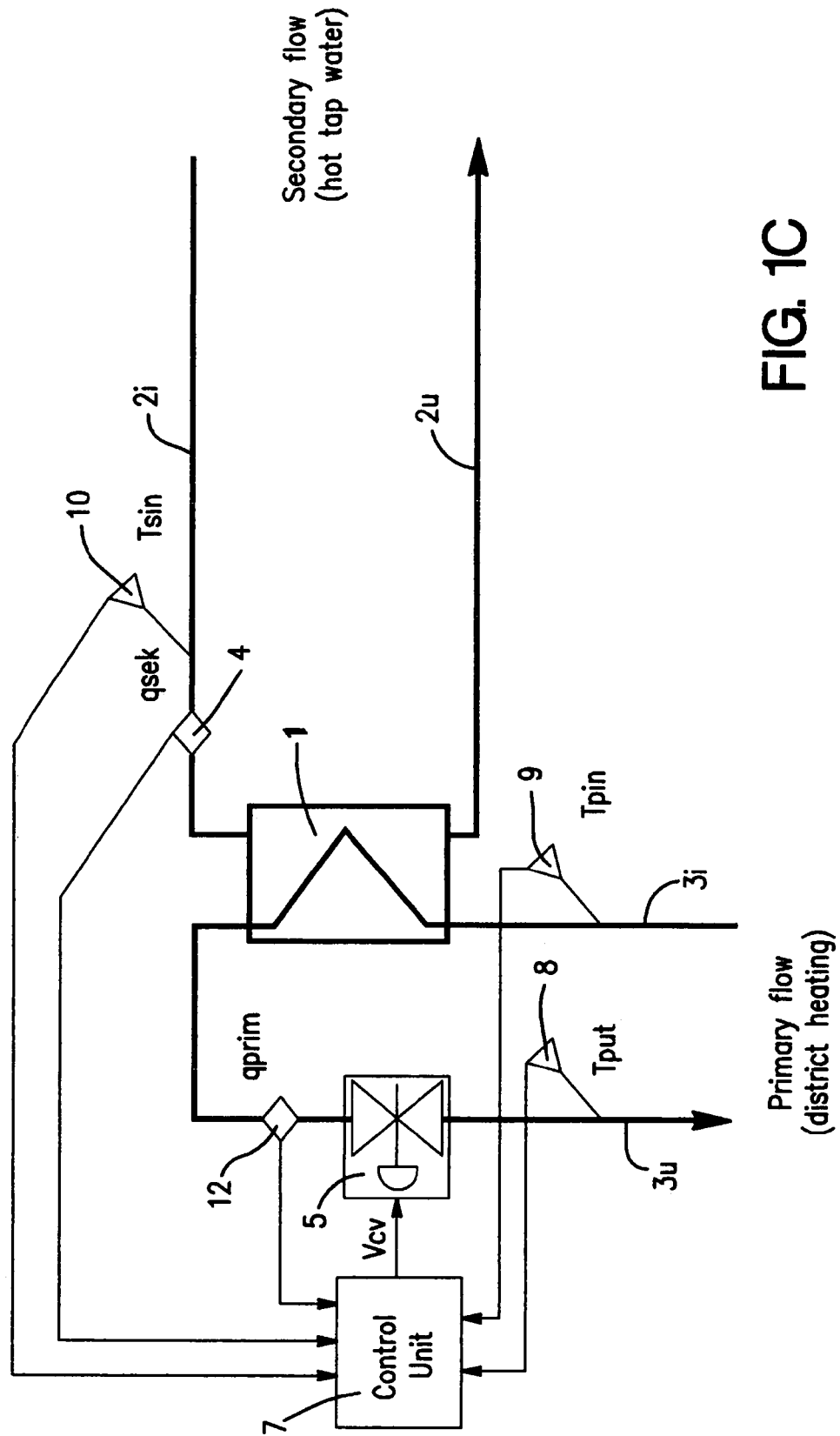

Another embodiment is shown in FIG. 1c, where the control of the desired flow takes place by measuring the primary flow 3 with a flow gauge 12, and by regulating the opening degree of the valve, a to a desired primary flow (N. B., local regulatory loop with feedback of the actual flow value).

Figure 1D:
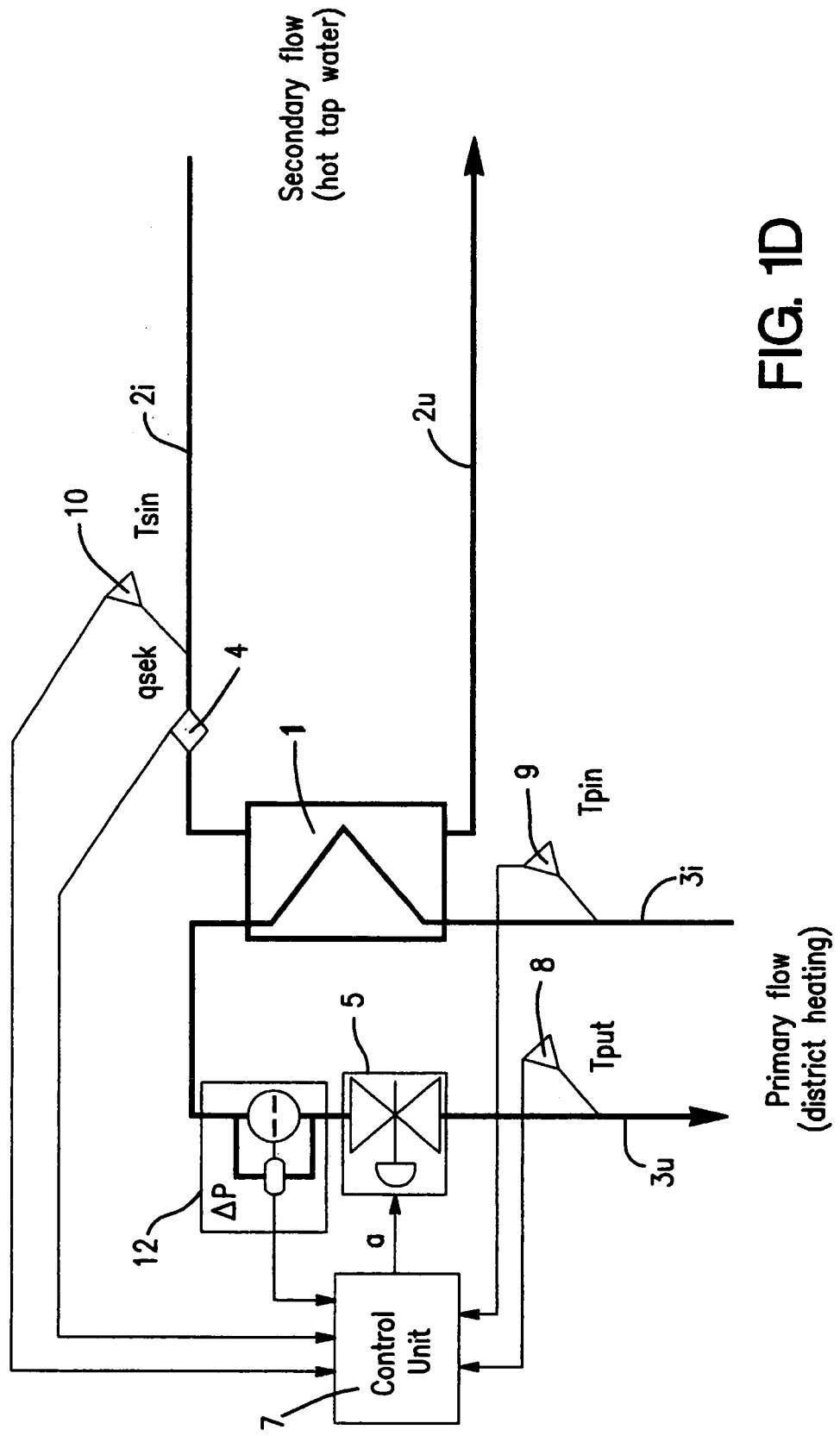

The embodiment of FIG. 1d is a fourth variety, in which the flow measurement is effected by means of a stationary constricting member 13, and a gauge 6, arranged across it, for measurement of the difference pressure across the constricting member.

Figure 2:
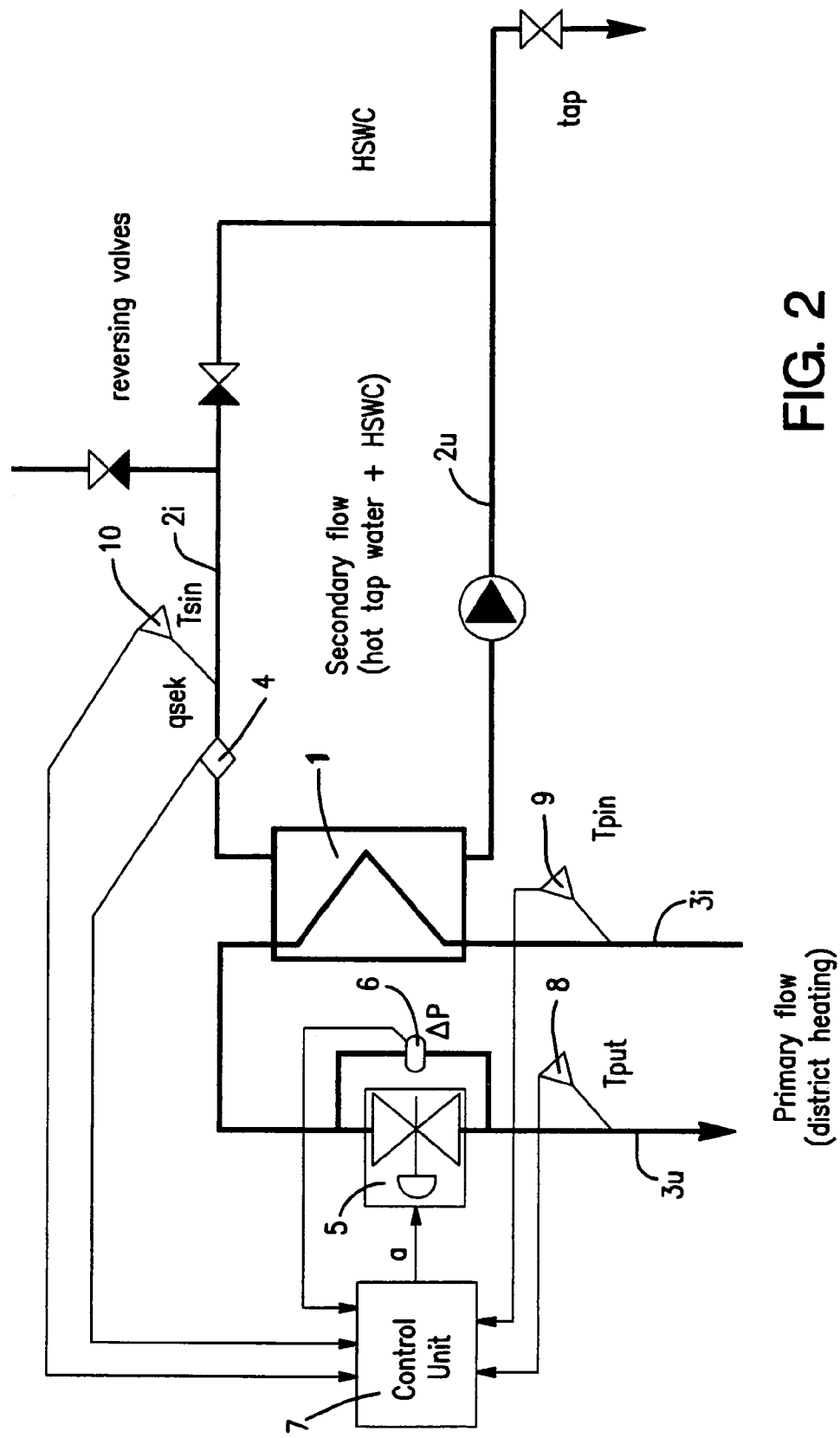
FIG. 2 shows an example of a variation of the system with a hot tap water and Hot Service-Water Circulation (HSWC).

FIG. 2 shows an embodiment, where incoming freshwater 2i on the secondary side is constituted of a mixture of cold water and recycled, so called HSWC flow of hot water. In this case, a varying temperature of the inbound secondary flow 2 is obtained, whereby a temperature gauge 10 for measuring this temperature Tsin has to be included.

Figure 3:
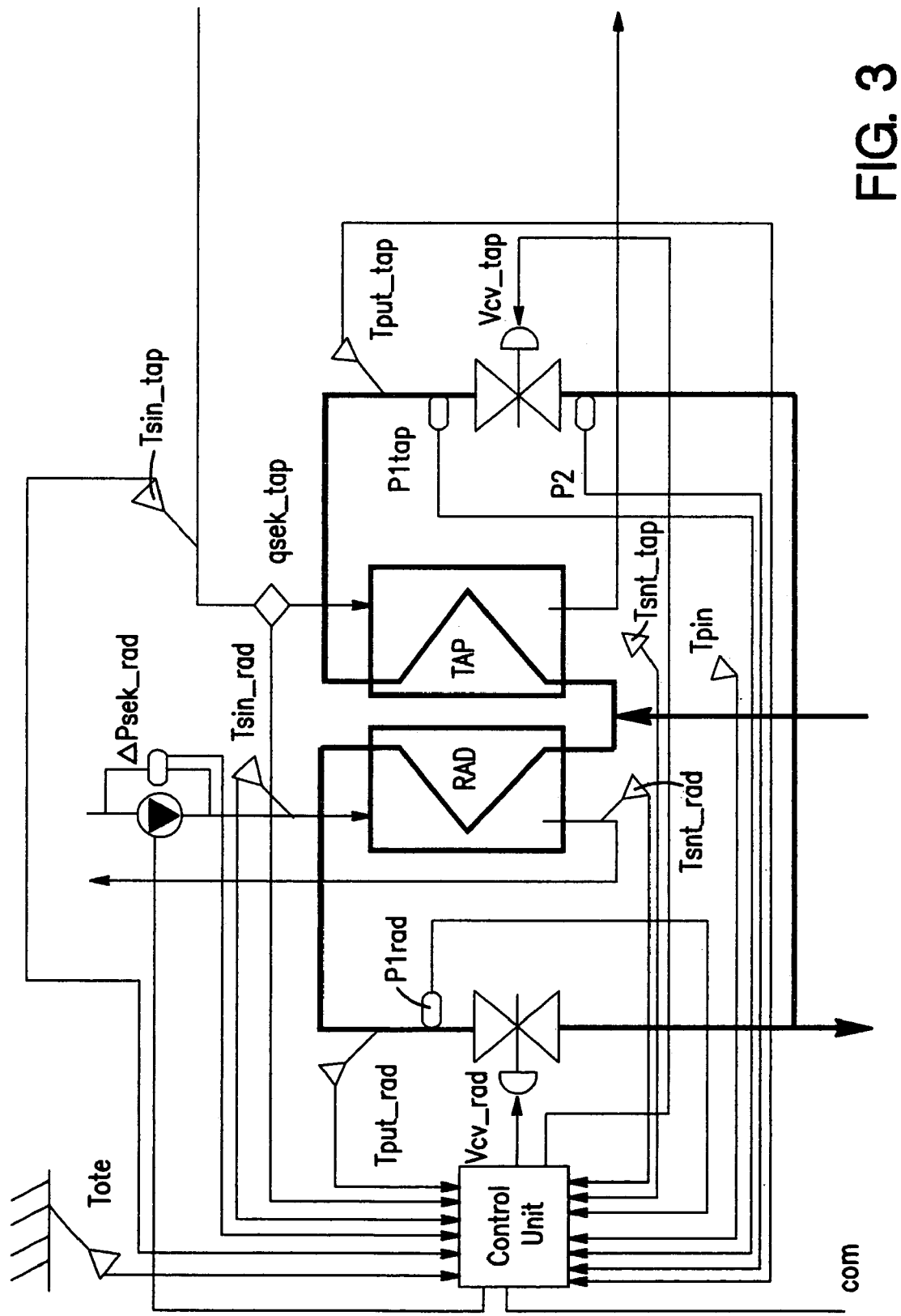
FIG. 3 shows an example of a connection diagram of a district heating plant, including functions for hot tap water control and radiator water control, measurement of heat quantity, error detection, an alarm, and with means of communication to a superior system.

FIG. 3 shows an embodiment of the invention in a district heating station, where a number of occurring functions have been included. The functions of the example comprises hot tap water control and radiator water control, and measurement of total transferred heat quantity in the respective circuit, as well as presentation of this information via a communication link (com) to an external superior system. Diagnostic functions for the heat exchanger and the other components of the station, implemented by means of measurement values occurring in the system, and communication with the superior central via (com), are contemplated to be part of the functions carried out by the control unit 7. Sensors for resulting outbound secondary temperatures are contemplated to occur for any control and/or alarm upon failure in the control function and/or the measurement of heat quantity (whereby this sensor value is not used in the dynamic temperature consistency).

Basic Theory for the Control

The invention is based on that the yielded/absorbed power of the primary circuit is to be controlled towards a currently desired supplied/removed power to/from the secondary medium, in order to change the temperature from the current temperature of the inbound secondary flow to a desired temperature of the outbound secondary flow. This is carried out through control of the flow in the primary circuit in dependence of the difference between the temperatures of the inbound and outbound primary flows.

In general, for the primary and secondary circuits of heat exchangers:

$$Q' = m*(h(T_{in}) - h(T_{out})) \tag{A}$$

Where Q' corresponds to the power transported by the circuit to the heat exchanger, m corresponds to the mass flow in the circuit, h(T) corresponds to the enthalpy of the medium (energy per mass unit) at temperature T, $T_{out}$ corresponds to the temperature of the outbound flow, and $T_{in}$ corresponds to the temperature of the inbound flow.

Equation (A) may be written alternatively as:

$$Q' = m*C_p*\Delta T \tag{A2}$$

where $C_p$ is the heat capacity of the medium, and $\Delta T = T_{out} - T_{in}$.

The desired effect supplied to the secondary medium, $-Q'_{sek\_set\,point}$, in order to achieve the desired temperature of the outbound secondary flow, is governed by the equation:

$$-Q_{sec\_set\,point} = m_{sec}*(h_{sec}(T_{sec\_out\_set\,point}) - h_{sec}(T_{sec\_in})) \tag{A3}$$

where $m_{sec}$ corresponds to the mass flow in the secondary circuit, $h_{sec}(T)$ corresponds to the enthalpy of the secondary medium at temperature T, $T_{sec\_out\_set\,point}$ corresponds to the desired temperature of the outbound secondary flow, and $T_{sec\_in}$ corresponds to the current temperature of the inbound secondary flow.

During heat exchange, there is a power balance where the sum of supplied power via the primary side $Q'_{prim}$, via the secondary side $Q'_{sec}$, and via any leakage $Q'_{leak}$ to the heat exchanger equals the increase of the energy stored in the heat exchanger per time unit $Q'_{vx}$, i.e.

$$Q'_{vx} = Q'_{prim} + Q'_{sec} + Q'_{leak} \tag{B}$$

The invention comprises control of the power yielded from the primary side $Q'_{prim}$, so that:

$$Q'_{prim} = Q'_{sec\_set\,point} - Q'_{leak} + Q'_{vx} \tag{B2}$$

If the leakage effect is negligible, $Q'_{leak}$ is also set to zero, which gives:

$$Q'_{prim} = Q'_{sec\_set\,point} + Q'_{vx} \tag{B3}$$

During load changes it may be appropriate to consider $Q'_{vx}$, which constitutes a dynamic effect of changes in stored energy in the heat exchanger. For example, a system may be controlled by means of a regulatory valve with a relatively low speed of adjustment. This will, e.g. in the case of a rapid reduction in load, imply that the primary circuit delivers more energy than desired, as long as the control member has not reached the desired position. The supplied "surplus energy" is partly stored in the heat exchanger, and will entail a temporary increase of the outbound secondary temperature. This increase in temperature may be minimised by means of that the control is compensated for the surplus energy in the heat exchanger by temporarily reducing the supplied primary power until the surplus energy has been removed by the secondary flow.

In stationary condition, the energy stored in the heat exchanger is not altered, i.e., $Q'_{vx} = 0$, which when inserted into equation (B3) gives:

$$Q'_{prim} = Q'_{sec\_set\,point} \tag{B4}$$

Insertion of equation (A) applied to the primary side, and (A3) into equation (B4) yields:

$$m_{prim\text{-}set\,point}*(h_{prim}(T_{prim\_in}) - h_{prim}(T_{prim\_out})) = m_{sec}*(h_{sec}(T_{sec\_out\_set\,point}) - h_{sec}(T_{sec\_in})) \tag{C}$$

Elimination of $m_{prim\text{-}set\,point}$ from equation (C) gives the basic control principle of the invention in the form:

$$m_{prim\_desired} = m_{sec}*\left(\frac{h_{sec}(T_{sec\_out\_desired}) - h_{sec}(T_{sec\_in})}{h_{prim}(T_{prim\_in}) - h_{prim}(T_{prim\_out})}\right) \tag{D}$$

This basal control principle may be evaluated in different forms and with a differing degree of approximate simplifications, some of which are shown below. Flows are often determined in the form of volume flows, and it is thus not necessary to recalculate equation (D) for volume flows. For mass flow, m:

$$m = q*\rho \tag{E}$$

where q is the volume flow and ρ is the density. Since ρ is temperature dependent, the temperature at which a volume flow is determined should often be taken into consideration. Assume that the volume flow of the secondary side $q_{seq}$ is determined at the inbound side, and that the desired flow of the primary side $q_{prim\_set\ point}$ is determined at the outbound side. After insertion of equation (E) into equation (D), the equation may be solved for $q_{prim\_set}$ point.

$$q_{\text{prim\_desired}} = q_{\text{sec}} * \frac{\rho_{\text{sec}}(T_{\text{sec\_in}})}{\rho_{\text{prim}}(T_{\text{prim\_out}})} * \frac{h_{\text{sec}}(T_{\text{sec\_out\_desired}}) - h_{\text{sec}}(T_{\text{sec\_in}})}{h_{\text{prim}}(T_{\text{prim\_in}}) - h_{\text{prim}}(T_{\text{prim\_out}})} \quad (F)$$

If the volume flow is determined elsewhere, equation (E) should be applied at the temperature of the medium at the volume measurement location. For the enthalpy h(T):

$$h(T) = c_p * T \quad (G)$$

where $c_p$ is the heat capacity (energy per unit weight and degree).

Insertion of equation (G) into equation (F) gives:

$$q_{\text{prim\_desired}} = q_{\text{sec}} * \frac{\rho_{\text{sec}}}{\rho_{\text{prim}}} * \frac{c_{p(\text{sec})} * \Delta T_{\text{sec\_desired}}}{c_{p(\text{prim})} * \Delta T_{\text{prim}}} \quad (F2)$$

where $\Delta T_{sec\_set\ point} = T_{sec\_out\_set\ point} - T_{sec\_in}$ and $\Delta T_{prim} = T_{prim\_in} - T_{prim\_out}$.

By use of the same media in the primary and secondary circuits, and the temperature dependence of ρ and $c_p$ is neglected ($\rho_{sec} = \rho_{prim}$; $c_{p(sec)} = c_{P(sec)}$), the equation (F2) may be reduced to:

$$q_{\text{prim,bör}} = q_{\text{sec}} * \frac{\Delta T_{\text{sec\_bör}}}{\Delta T_{\text{prim}}} \quad (F3)$$

Thus, the invention may be evaluated according to several more or less approximate methods (e.g., by control according to equation D, F, F2 or F3). They all have in common that they are based on a parameter array, characteristic of the enthalpy difference (Δh) between the primary flow (3i) inbound to the heat exchanger (1) and the secondary flow (3u) outbound from the heat exchanger (1), e.g. a number of points for the function h(T) in the primary medium in a temperature range characteristic for the application, and $T_{prim\_out}$, $T_{prim\_in}$. An example of an alternative characteristic parameter array for said enthalpy difference is constituted by the heat capacity $c_p$ for the primary medium in a temperature range that is relevant for the application, and the temperature difference $\Delta T_{prim}$.

Similarly, different characteristic parameter arrays for the mass flow ($m_{sec}$) in the secondary circuit (2) and the mass flow ($m_{prim}$) in the primary circuit (3) may be used according to the invention.

The Construction of the Regulatory Valve

The valve 5 may be of different design, with flow characteristics for the particular construction known. Examples of valves include seat, sliding, ball or mushroom valves. When using a sliding valve, which is affected by an opening/closing regulating screw, the magnitude of the opening is substantially proportional to the stroke a.

For each type of valve, the flow characteristics kv(a) may be determined, depending on the current pressure across the valve $\Delta P_{valve}$, the flow through the valve $Q_{valve}$, and the degree of opening a of the valve. Thus, the flow through the valve is determined by the relationship $$q_{valve} = k_v(a) \cdot \sqrt{\Delta p_{valve}} \quad (H)$$

from which may be solved;

$$k_v(a) = \frac{q_{ventil}}{\sqrt{\Delta p_{ventil}}} \quad \text{and} \quad (I)$$

$$a = f_{cv}\left(\frac{q_{ventil}}{\sqrt{\Delta p_{ventil}}}\right) \quad (J)$$

where $f_{cv}(x)$ is the inverse function of $K_v(x)$.

Control Function on a Valve with Differential Pressure Measurement

During use of a valve, the position of the valve is controlled so that a correct flow is obtained. For each type of valve, it is possible to determine empirically the obtained flow, based on of the current valve position and differential pressure across the valve.

The valve position a, desired for control, may be expressed as a function of the detected flow of the secondary circuit, the detected temperature difference on the primary side, the detected differential pressure over the regulatory valve, and the desired temperature difference of the secondary circuit.

For each desired flow in the primary circuit, control of the valve position a may be effectuated according to the equation:

$$a_{desired} = f_{cv}\left(\frac{q_{\text{prim\_desired}}}{\sqrt{(\Delta p_{valve})}}\right) \quad (J2)$$

which, upon insertion of equation (F) into equation (J2), yields a form of the control principle of the invention:

$$a_{desired} = f_{cv}\left(\frac{q_{\text{sec}}}{\sqrt{(\Delta p_{valve})}} * \frac{\rho_{\text{sec}}(T_{\text{sec\_in}})}{\rho_{\text{prim}}(T_{\text{prim\_ut}})} * \frac{h_{\text{sec}}(T_{\text{sec\_ut\_desired}}) - h_{\text{sec}}(T_{\text{sec\_in}})}{h_{\text{prim}}(T_{\text{prim\_in}}) - h_{\text{prim}}(T_{\text{prim\_out}})}\right) \quad (K)$$

or, upon insertion of (F3) into (J2):

$$a_{bör} = f_{cv}\left(\frac{q_{sck}}{\sqrt{\Delta p_{ventil}}} * \frac{\Delta T_{\text{sck\_bör}}}{\Delta T_{prim}}\right) \quad (K2)$$

since the same heat carrier is used on the primary and secondary sides, and since the temperature dependence of p and $c_p$ is neglected. For each valve, current inverse flow characteristics fcv(x) (and/or its flow characteristics kv(x)) may be empirically determined.

Determination of the differential pressure $\Delta P_{valve}$ is contemplated to be able to be performed in an arbitrary way, for example, by means of a pressure difference gauge connected upstream and downstream of the valve, or by means of a first absolute pressure gauge for measuring the pressure P1 upstream of the valve and another absolute pressure gauge for measuring the pressure P2 downstream of the valve.

Measurement of Power and Heat Quantity

Measurement of supplied effect and heat quantity may be conducted on the primary side and/or the secondary side of a heat exchanger, based on equation (A). Equations (H) and (E), applied to the medium in the valve, inserted into equation (A) gives:

$$Q'_{prim} = \rho_{prim}(T_{prim\_valve}) * k_v * \sqrt{(\Delta P_{valve})} * (h(T_{prim\_in}) - h(T_{prim\_out})) \quad (L)$$

where $T_{prim\_valve}$ is the temperature of the primary medium in the valve. If the valve is placed in the outbound primary flow (3u) from the heat exchanger, $T_{prim\_valve} \cong T_{prim\_out}$, and, respectively, if it is placed in the inbound primary flow (3i) to the heat exchanger, $T_{prim\_valve} \cong T_{prim\_in}$.

After insertion of equation (G) into equation (L), the alternative equation $$Q'_{prim} = \rho_{prim}(T_{prim\_valve}) * k_v(a) * \sqrt{(\Delta p_{valve})} * c_p * \Delta t_{prim} \quad (L2)$$

is obtained.

According to a preferred embodiment of the invention, the power supplied at the primary side is governed partly through determination of the temperatures $T_{prim\_in}$, $T_{prim\_out}$, and the differential pressure $\Delta P_{valve}$ over a regulatory valve placed downstream of the outlet of the primary side; and partly through knowledge of the characteristics of the valve $k_v(a)$ and the percentage opening a, and the density and enthalpy of the primary medium, which values are used for the calculation of $Q'_{prim}$ according to equation (L), alternatively (L2).

By integrating the effect yielded during a period of time t1–t2, the heat quantity supplied by the primary circuit during this period is obtained.

$$Q_{prim} = \int_{t1}^{t2} (Q'_{prim}) \partial t \quad (M)$$

Equation (L) inserted into equation (M) yields:

$$Q_{prim} \int_{t1}^{t2} (\rho_{prim}(T_{prim\_valve}) * k_v(a) * \sqrt{*(\Delta p_{valve}) * (h(T_{prim\_in}) - h(T_{prim\_out})))} \partial t \quad (M2)$$

The integration may be carried out, e.g., by determination and summation of partial energies one by one, which energies are determined as products of periodical average power values $\overline{Q_{prim\_i}}$ and the corresponding time periods for the formation of the average value of $\Delta t_i$:

$$Q_{prim} = \sum_{i=1}^{n} (\overline{Q_{prim\_i} * \Delta t_i}) \quad (M3)$$

According to a preferred embodiment of the invention, yielded power and heat quantity is determined also on the secondary side. Here, the determination is based on the temperatures $T_{sec\_in}$ and $T_{sec\_out}$, (measured by a fourth temperature gauge) and a flow value $q_{seq}$, (measured by a flow gauge or determined in some other way, e.g., through a rpm-controlled pump with known characteristics) and on equation (A).

If a stationary state is assumed and heat leakage from the heat exchanger is neglected, the value of the yielded effect and heat quantity on the primary side constitutes a first measure, and the value of yielded effect and heat quantity on the secondary side constitutes a second measure of the power Q' and the heat quantity Q that has been transferred in the heat exchanger. Either one of these two independently determined measures of yielded effect and heat quantity may be utilised e.g. for billing or follow-up of energy expenditure.

By comparison of these two independently determined measures, the security of the system can be increased. For example, the redundant values of Q' may be used in order to generate an alarm when the measures are not reliable if said measures deviate from each other by more than a given acceptable value of, say, ±10%, or preferably ±2%, of the higher value.

A second area of utilisation could be to, based on the determination of Q' through either of the methods, switch the system into reserve mode, provided that an error in a measurement signal, which is included in determination of Q' according to the other method, was detected in a different independent manner. Example: if it is determined, e.g., through a reasonability check, that a temperature gauge on the primary side is out of order, it is possible to determine a reserve value for the broken gauge by using a value of Q' determined on the secondary side. In similar manner, reserve values may be calculated for any gauge, for which error has been detected through an independent method.

A third use could be to self calibrate a gauge or e.g. the valve characteristics in the same way used to calculate spare values in the case of a faulty gauge.

Integrated Valve Units

Figure 4:
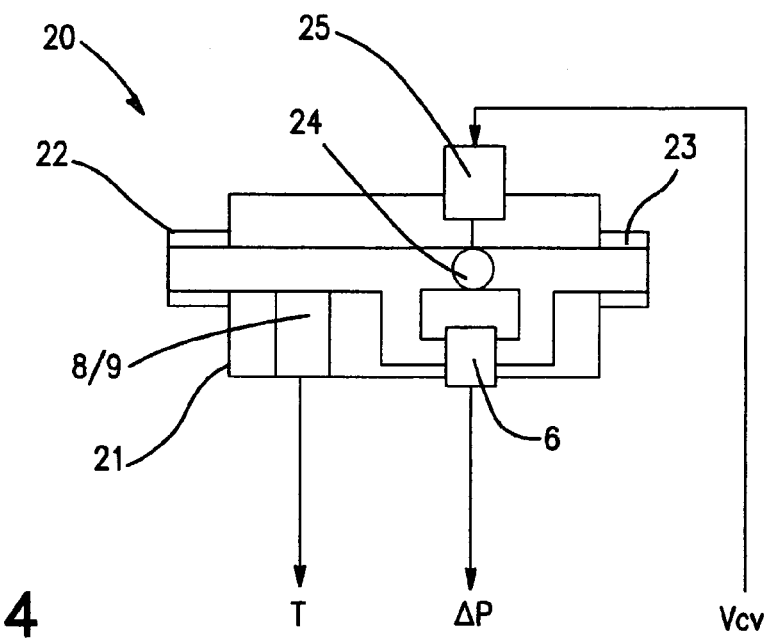
FIG. 4 schematically shows an integrated hydraulic unit for the control and measurement of a primary flow according to the invention, including valve member, differential pressure sensor, and temperature sensor, and a control member acting on the valve member, which may be integrated in the hydraulic unit or, alternatively, arranged on the same.

In order to simplify manufacture and assembly of systems according to the invention, several functions may in a preferred embodiment be brought together into an integrated valve unit, which may be produced as a semi-manufacture for subsequent assembly into a complete system. FIG. 4 schematically shows an integrated hydraulic unit for the control and measurement of a primary flow according to the invention, including valve member, differential pressure sensor, and temperature sensor, and a control member acting on the valve member, which may be integrated in the hydraulic unit or, alternatively, arranged on the same. This hydraulic unit may advantageously be used to control the primary flow and measure the differential pressure across valve members, and the temperature of the primary flow at the valve.

Figure 5:
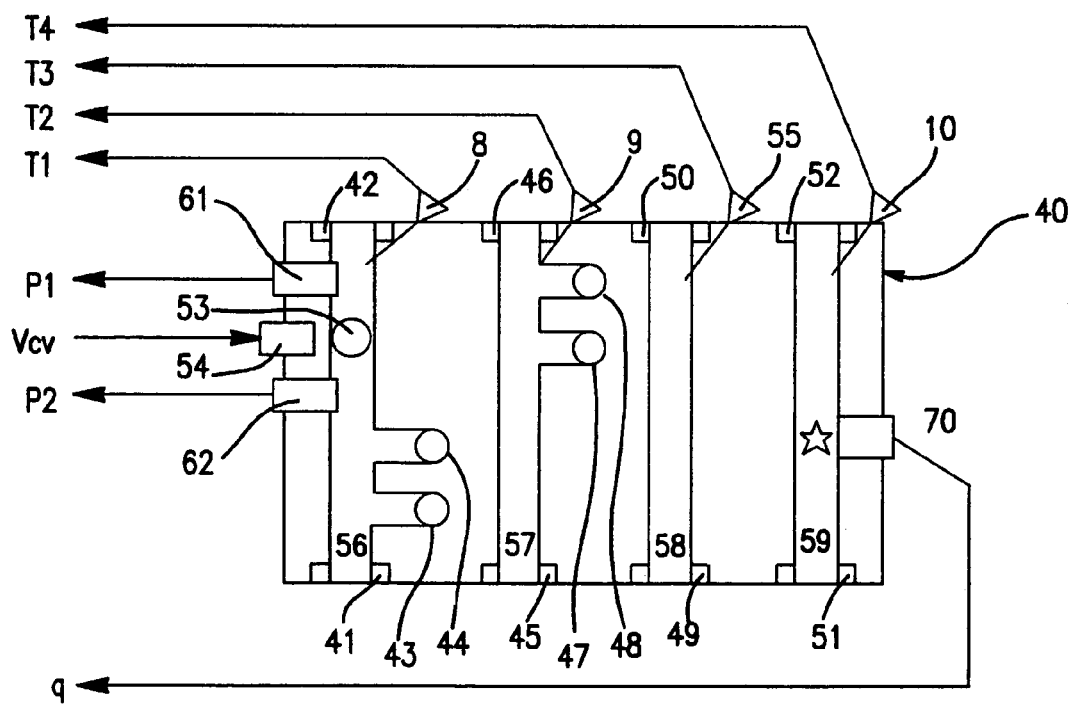
FIG. 5 shows a section through an integrated hydraulic unit comprising several occurring functions of the invention, for a heat exchange circuit.
Figure 6:
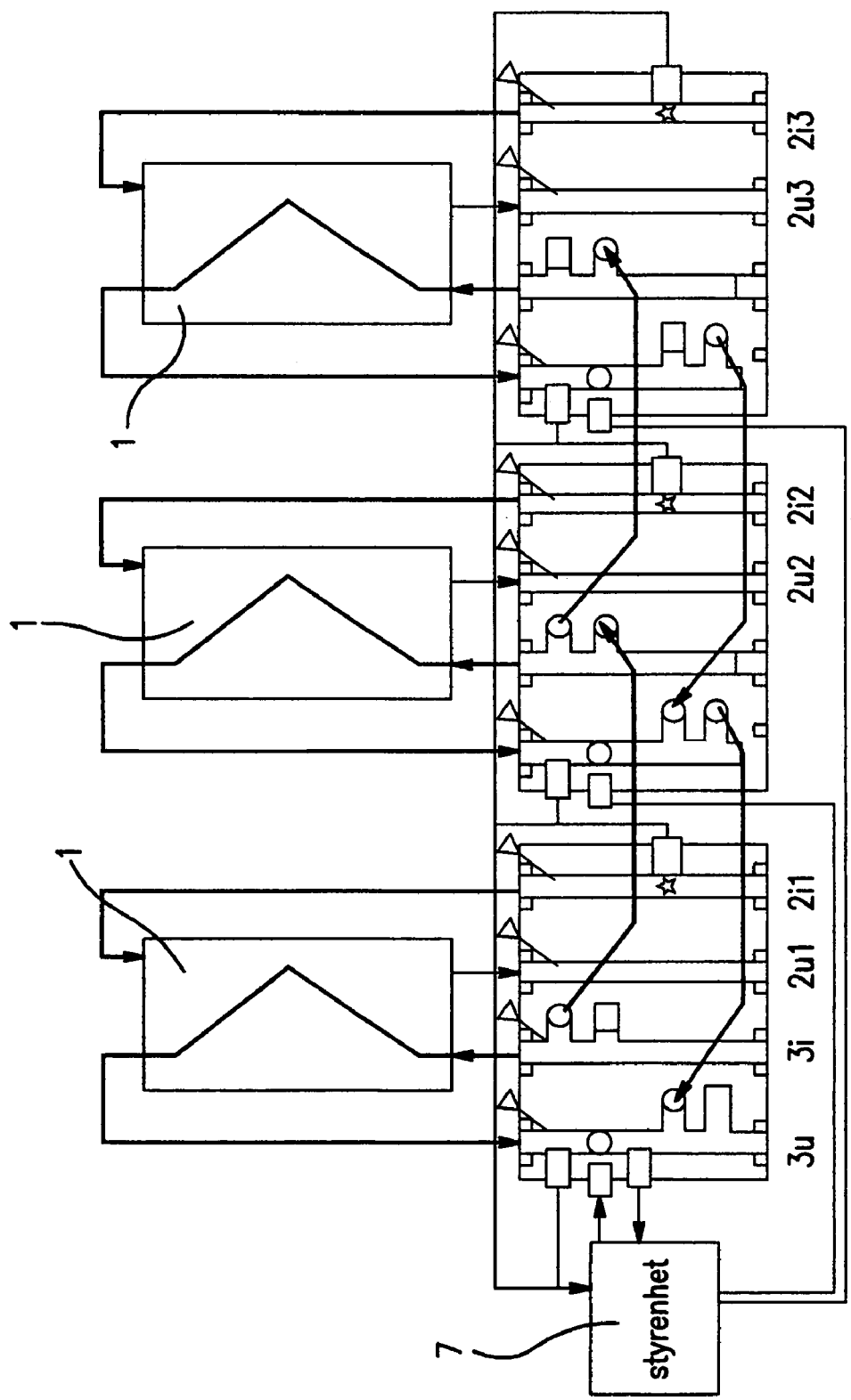
FIG. 6 shows three heat exchangers, each connected to an integrated hydraulic unit, interconnected for mutual connection of primary flow and three separate connections for secondary flows, and a common control unit.

Several functions/components may be integrated into a hydraulic unit 40, shown in FIG. 5, comprising a first channel 56 between the pipe joints 41 and 42 for connection to the district heating system and the heat exchanger, respectively, and branches 43 and 44 to any adjacent further hydraulic units; see FIG. 6.

In the channel 56, a valve member 53 is arranged, which is controlled by a control member 54. Gauges 61 and 62 are arranged on both sides of the valve member 53 for measuring the pressure difference upstream and downstream of the valve member. Gauges 8 are also arranged in the channel 56 in order to determine the temperature of the medium in the channel 56. A second channel 57 is arranged in the hydraulic unit 40, which channel may be connected via the pipe joints 45 and 46 to the inbound medium of the district heating system, and to the heat exchanger, respectively. Branchings 47, 48 from the second channel 57 may possibly be utilised for connecting to adjacent further hydraulic units. Gauges 9 are also arranged in the other channel 57 in order to determine the temperature of the medium in this channel. A third and fourth channel 58 and 59 are also part of the hydraulic unit 40, with pipe joints 49 and 51 for connection to the heat/cooling consumer, and pipe joints 50 and 52 towards the heat exchanger. In order to determine the temperature of the medium in the channels 58 and 59, gauges 55 and 10 are arranged in the respective channel. In order to determine the flow of the medium in the channel 59, a gauge 70 is arranged. Contact members (not shown) for connection of power lines to and from the hydraulic unit 40 are provided, which transfer measurement and/or control signals.

The integrated hydraulic unit in FIG. 4 may be produced advantageously in the form of semi manufacture for subsequent assembly into a complete system, for example as shown in FIG. 6. The hydraulic units entail potential advantages in addition to those already mentioned, through the considerable simplification of the lying down and connection of primary and secondary circuits.

Further Embodiments

In the most common embodiment, the outbound temperature from the heat exchanger 1 of the secondary flow 2 is constant, e.g., 55° C. Of course, this could also be a manually or automatically adjustable set point value. The control unit 7 may obtain an adjustment of the desired value, for example by a potentiometer. A certain manual adjustment may take place, depending on desires of hot water consumers, or adjusted to the current season of the year. For example, during winter, there may be demand for a slightly warmer hot tap water in order to compensate for heat loss between the heat exchanger and the most remote users. Correction of the seasonally dependent outbound temperature on the secondary side may also be effected automatically in the control unit according to a predetermined compensation curve and/or a signal from an external temperature gauge.

In one application of the invention in a system where the heat exchanger is to heat a radiator circuit, corresponding correction is needed in most cases, depending on the outside temperature, as well as correction of the temperature of the inbound secondary flow. In this implementation, too, there is no need for a direct feedback of the temperature of the outbound flow on the primary side.

The control member for the regulatory valve may be of several different kinds, and possess a control signal corresponding to the current control member. For example, valves with a servomotor controlled by PWM (pulse width modulation), or with flow control proportional to the control current or voltage, may be used.

The method of the invention may be advantageously combined with diagnostics for the heat exchanger. In those embodiments where the differential pressure across the valve is measured, an initial clogging on the primary side (caused by calcium deposits, dirt etc.) may be detected by analysis of the pressure drop with time for a given opening degree of the valve. During initial clogging, the pressure drop across the regulatory valve drops for a constant flow, since an ever-increasing pressure drop will be absorbed by the heat exchanger. Evaluating changes in the heat transfer of the heat exchanger may also perform the diagnostics. For example, the following procedure may be applied: All measured signals (at least the temperature difference in the primary circuit, primary flow, secondary flow and the desired temperature difference on the secondary side) are saved for a number of different load conditions (transferred power) and system conditions (inbound primary temperature and pressure). Upon clogging of the heat exchanger, the heat transfer characteristics deteriorate, which entails a demand for increasing primary flows.

The wanted difference temperature $\Delta T_{prim}$ may be calculated based on $T_{prim(in)}$ and $T_{prim(out)}$, or directly measured as a temperature difference, e.g., with a thermo element.

Since the system contains flow measurement as well as difference temperature, a calculation of consumed heat quantity for billing of the end consumer may be easily introduced.

Further, the system is well suited for reading (calculation of heat transfer), diagnosis (clogging), climate control (central adjustment of set point values), and a possible switch off function. Only a single interface to a communications link is needed, which interface is connected to the control or regulatory unit.

The invention is not limited to use in district heating stations; it may be used in all applications of which heat exchangers are a part, for example, in the petrochemical industry or other forms of heat control.

The invention claimed is:

1. A procedure for controlling the temperature of at least one outbound secondary flow (2*u*) in a secondary circuit from a heat exchanger (1) by means of a primary flow (3) in a primary circuit, where a control unit (7) controls a regulatory member (5, 11) that regulates the primary flow, wherein the temperature $T_{sec\_in}$ of the inbound secondary flow (2*i*) in the secondary circuit is known or measured, characterised in that, a) a parameter array, characteristic of the enthalpy difference (Δh) between the inbound primary flow (3*i*) to the heat exchanger (1) and the outbound primary flow (3*u*) from the heat exchanger (1), is determined, b) a parameter array, characteristic of the mass flow ($m_{sec}$) in the secondary circuit (2), is determined, c) a parameter array, characteristic of the mass flow ($m_{prim}$) in the primary circuit (3), is determined, d) and that the parameters determined in points a) through c) are transmitted to the control unit (7) for controlling the regulatory member (5, 11), wherein the primary flow (3) is controlled in dependence of the secondary flow (2), so that the power transferred between the heat exchanger and the primary flow (3) substantially corresponds to the sum of:

1) the power needed to change the temperature of the secondary medium from the current inbound temperature $T_{sec\_in}$ to the desired outbound temperature $T_{sec\_out\_set\ point}$ and 2) assumed power demand for compensation of stored energy in the heat exchanger (1), and 3) assumed leak power from the heat exchanger.

2. A procedure according to claim 1, characterised in that, control of the regulatory member occurs through flow balancing of the primary flow (3) against the secondary flow (2) in such a way that a power balance is maintained between the primary flow (3) and the secondary flow, where the supplied and consumed power in the respective flow circuit is given by:

$Q = \rho \cdot c_p \cdot q \cdot \Delta T$, from which power balance is given that the flow on the primary side $q_{prim}$ is obtained through control of the control member in such a way that $$q_{prim} = \cdot q_{sek} \cdot \left( \frac{\rho_{sek} \cdot c_{P_{sek}} \cdot \Delta T_{sek}}{\rho_{prim} \cdot c_{P_{prim}} \cdot \Delta T_{prim}} \right)$$

$\rho_{sec/prim}$=predetermined density of the medium in the secondary and the primary circuit, respectively, $c_{psec/prim}$=predetermined specific heat of the medium in the secondary and the primary circuit, respectively, $Q_{prim}$=the flow in the primary circuit obtained from the control member $q_{sec}$=actual measured flow in the secondary circuit $\Delta T_{prim}$=actual measured temperature difference between the inbound and outbound media on the primary side, and $\Delta T_{sec}$ is the desired temperature difference between the inbound and outbound media of the secondary side, the temperature on the outbound side of the secondary circuit only being a set point value, wherein the control of the regulatory member is effected without direct feedback of the temperature of the outbound side of the secondary circuit.

3. A procedure according to claim 2, characterised in that, the temperature ($T_{sec\_in}$) of the inbound secondary flow (2i) to the heat exchanger is detected (10), which detected value is used for calculation of $q_{prim\_set\ point}$.

4. A procedure according to claim 2, characterised in that the regulatory member (5) is constituted by a regulatory valve with known flow characteristics and by a pressure difference (pressure drop) across the regulatory valve determined by a difference pressure gauge (6).

5. A procedure according to claim 2, characterised in that, the regulatory member is constituted by a pump (11) with a predetermined relationship between the flow through the same as a function of the rotational speed and differential pressure across the pump, wherein the control unit (7) regulates the rotational speed of the pump.

6. A procedure according to claim 1, characterised in that the regulatory member (5) is constituted by a regulatory valve with known flow characteristics and by a pressure difference (pressure drop) across the regulatory valve determined by a difference pressure gauge (6).

7. A procedure according to claim 6, characterised in that, the degree of opening (a) of the valve is a function of the inverse flow characteristics $f_{cv}(x)$ of the valve according to:

$$a = f_{cv}(q_{prim\_set\ point} / \sqrt{(\Delta p_{valve})})$$

where $\Delta p_{valve}$ is the measured differential pressure across the regulatory valve and $q_{prim\_set\ point}$ is the flow through the valve, and a is the degree of opening of the valve.

8. A procedure according to claim 1, characterised in that, the regulatory member is constituted by a pump (11) with a predetermined relationship between the flow through the same as a function of the rotational speed and differential pressure across the pump, wherein the control unit (7) regulates the rotational speed of the pump.

9. A procedure according to claim 1, characterised in that, the flow and temperature values in the primary and secondary circuits are used for diagnosing and detecting clogging of the heat exchanger and/or impaired heat transfer value for the heat exchanger.

10. A device for controlling the temperature of at least one outbound secondary flow (2) from a heat exchanger (1) in a secondary circuit by means of a primary flow (3) in a primary circuit passing through the heat exchanger, where a control unit (7) controls a regulatory member (5, 11) arranged to regulate the primary flow, characterised in that temperature gauges (8, 9) are arranged to measure the temperature of the primary flows inbound to (3i) and outbound from (3u) the heat exchanger (1) for determining the enthalpy difference between these flows, a flow gauge (4) is arranged to measure the flow ($q_{sec}$) of the secondary medium (2), difference pressure gauges (6) are arranged to measure the pressure difference ($\Delta P$) in the primary medium (3i) across the regulatory member (5), or that a flow gauge (12) is arranged to measure the flow ($q_{prim}$) of the primary medium (3), and that the output signals from said gauges (4,8,9,12) are arranged to be transmitted to the control unit (7) for controlling the regulatory member (5, 11), wherein the primary flow (3) is arranged to be controlled in dependence of the secondary flow (2), so that the power transferred between the heat exchanger and the primary flow (3) substantially corresponds to the sum of:

1) the power needed to change the temperature of the secondary medium from the current inbound temperature $T_{sec\_in}$ to the desired outbound temperature $T_{sec\_out\_set\ point}$ and 2) assumed power demand for compensation of stored energy in the heat exchanger (1), and 3) assumed leak power from the heat exchanger.

11. A device according to claim 10, characterised in that, the regulatory member (5) is constituted by a regulatory valve of known flow characteristics, a differential pressure gauge (6) is arranged to measure the differential pressure across the valve, and by known flow characteristics for the valve (5) stored in the memory of the control unit (7).

12. A device according to claim 11, characterised in that, the control unit (7) comprises at least one memory (30) for storing the degree of opening (a) of the valve (5) as a function of the flow $q_{sec}$ of the secondary circuit (2), the differential temperature $\Delta T_{sec}$ in the secondary circuit (2), the differential temperature $\Delta T_{prim}$ in the primary circuit (3), and the differential pressure $\Delta P_{valve}$ across the valve (5).

13. A device according to claim 10, characterised in that, the regulatory member is constituted by a pump (11) with a predetermined relationship between the flow through the same as a function of the rotational speed and differential pressure across the pump, whereby the control unit (7) is arranged to regulate the rotational speed of the pump.

14. A device according to claim 10,
characterised in that,
the valve (5) is integrated into a hydraulic unit (20) comprising a valve member (24) with a control member (25) acting on the same, pipe joints (22, 23) connected to the valve (5), a device for determining the differential pressure (6) across the valve member, which is connected upstream and downstream of the valve member (24), said temperature gauge (8) detecting the temperature of the flow through the valve.

15. A device according to claim 10,
characterised in that,
channels (56–59) for conducting medium (3i, 3u, 2i, 2u) to and from the heat exchanger (1) are integrated into a hydraulic unit,
that the channels at their ends are equipped with pipe joints (41, 42, 45, 46, 49, 50, 51, 52) for connection to primary and secondary flow (3, 2),
that lateral channels (43, 44, 47, 48) are branched from at least some of the channels, which lateral channels similarly are provided with pipe joints at their ends for connection of connecting lines between several connected hydraulic units, and
that channel parts for flow, differential pressure and temperature gauges (8, 9, 10, 55, 61, 62) communicating with the channels and at least one regulatory valve are arranged in the hydraulic unit.

16. A procedure for determining the power and heat quantity transferred to a heat exchanger via the primary circuit of the heat exchanger by means of a regulatory member (5,11), regulating the flow through the primary circuit, which member (5, 11) is controlled by a control unit (7),
characterised in that,
the enthalpy difference ($\Delta h$) between the primary flow inbound to (3i) and outbound from (3u) the heat exchanger (1) is determined, that the pressure difference ($\Delta p_{regulatory\_member}$) across, and the medium temperature ($T_{medium}$) in, the regulatory member (5, 11) with known flow characteristics stored in the memory of the control unit (7) are determined, that the density of the primary medium is stored in the memory of the control unit (7), that the enthalpy difference ($\Delta h$), the pressure difference ($\Delta p_{regulatory\_member}$), the temperature ($T_{medium}$) and the degree of opening (a) of the regulatory member are registered, which parameters together with the flow characteristics and the density stored in the memory of the control unit, provides a value of the power and heat quantity yielded by the primary circuit, characterised in that,
the determined value of the power and heat quantity yielded by the primary circuit are checked against simultaneously valid value of the power and heat quantity absorbed by the secondary circuit, which are calculated from the parameters enthalpy difference $\Delta h_{sec}$ between inbound and outbound secondary flow and flow $m_{sec}$, which are stored or determined in the control unit, wherein an alarm is provided to the environment via communication means if the values for power and heat quantity yielded and absorbed by the primary and secondary circuit, respectively, deviate from one another by more than a predetermined acceptable value.

* * * * *